United States Patent [19]
Wakikaido et al.

[11] Patent Number: 4,962,404
[45] Date of Patent: Oct. 9, 1990

[54] COPYING MACHINE

[75] Inventors: Takahiro Wakikaido; Tsukasa Sugiyama, both of Osaka, Japan

[73] Assignee: Mita Industrial Co., Ltd., Osaka, Japan

[21] Appl. No.: 440,599

[22] Filed: Nov. 22, 1989

[30] Foreign Application Priority Data

Nov. 26, 1988 [JP] Japan ................................ 63-299235

[51] Int. Cl.[5] ........................ G03B 27/48; G03B 27/50; G03B 27/70; G03G 21/00

[52] U.S. Cl. ........................................ 355/51; 355/317

[58] Field of Search ....................355/309, 317, 51, 57, 355/60, 50

[56] References Cited

U.S. PATENT DOCUMENTS

| | | | |
|---|---|---|---|
| 4,260,241 | 4/1981 | Honma et al. | 355/317 X |
| 4,595,275 | 6/1986 | Sonobe | 355/317 X |
| 4,597,660 | 7/1986 | Leng et al. | 355/317 |
| 4,663,722 | 5/1987 | Sato | 355/309 X |
| 4,690,545 | 9/1987 | Maehara | 355/57 X |
| 4,696,564 | 9/1987 | Watanabe | 355/317 X |
| 4,783,682 | 11/1988 | Maehara | 355/57 X |
| 4,893,150 | 1/1990 | Yamada | 355/317 X |

*Primary Examiner*—Richard A. Wintercorn
*Attorney, Agent, or Firm*—Koda & Androlia

[57] ABSTRACT

The present invention relates to a copying machine so composed that copying paper can be continuously fed from the stock section regardless of the movemental timing of the resist section, which has been so improved that the paper feeding speed or the paper feeding interval of the copying paper can be controlled in response to the relative scanning time of the optical system for a document.

6 Claims, 3 Drawing Sheets

COPYING MACHINE

BACKGROUND OF THE INVENTION

1. Field of the Invention

The present invention relates to a document copying machine which can consecutively feed copying paper from the stock section regardless of the movemental timing of the resist section.

2. Description of the Prior Art

In the case that copying is made with copying paper consecutively fed from the same stock section in the conventional document copying machine, it is so composed that a subsequent copying paper may begin being fed toward the resist roller from the stock section such as a paper feed cassette as soon as copying paper, which is located in the downstream of the transfer channel of the copying paper begins being fed toward the photosenstive drum by means of a resist roller (the secondary paper feeding roller) which constitutes the resist section.

In this case, in order to heighten the copying efficiency, the interval between a foregoing sheet of paper and a succeeding sheet of paper must be made shorter at the point where the sheets of paper pass through the transcribing portion. That is, it is necessary for the front end of succeeding sheet of paper to come up with the hind end of the foregoing sheet of paper, then the paper feeding speed of copying paper becomes comparatively high. For this reason, there remain such faults that the ratio of jam occurrence of copying paper is caused to become high in the transfer channel, and the ratio of failure occurrence to become high in the drive system.

On the other hand, another type of a document copying machine so composed that a still another resist section (the primary paper feeding roller) is provided at the upstream in the direction of transfer of copying paper and copying paper can be fed from the primary paper feeding roller to the secondary paper feeding roller when starting to feed the copying paper to the photosensitive drum from the secondary paper feeding roller has been developed. In this case, as it is possible for copying paper to be caused to wait for at the primary paper feeding roller, the transfer speed of copying paper in the transfer channel can be somewhat decreased.

Hereupon, in this case, as it is necessary that a primary paper feeding roller in addition to the secondary paper feeding roller and a clutch mechanism to turn on and off this primary paper feeding roller are newly provided, there is a still another fault that the cost of production is increased.

Therefore, recently, such a copying machine as copying paper is regularly fed from the stock section at a required interval of time in synchronization with the rotation speed of the photosensitive drum without waiting that copying paper passes through the secondary paper feeding roller on continuous copying has been developed, too.

In such a copying machine as shown in the above, as it is possible to feed copying paper at a speed in synchronization with the rotation speed of the photosensitive drum and with a fixed time interval, it is possible to carry out copying jobs quickly and with high efficiency at a comparatively slow speed of feeding the copying paper.

As the paper feeding speed can be made slow as shown in the above, the reliability of the copying machine can be enhanced and low-noise operation can be also accomplished. At the same time, a primary paper feeding roller and a clutch mechanism, which are necessary for securing a proper paper feeding timing in such conventional copying machines as shown in the above, can be curtailed, and a lowering of the cost of production can be accomplished, too. And in the case that the distance from the stock section to the resist section is very long, there may occur a case that the succeeding paper can not come up with the foregoing paper in the conventional copying machine having no primary paper feeding portion. Therefore, the copying number of paper per unit time may become uneven in the case of continuous feeding from one stock section and in the case of continuous feeding from the other stock section. However, as no influence may occur due to the distance of the paper feeding channel in such a method for continuously feeding copying paper from the stock section regardless of the operation timing of the resist section as shown in the above, the copying number of paper per unit time can be made uniform.

The limit of the copying number of paper in a copying machine is determined by the scanning capacity thereof, particularly the speed on which the optical system returns to the original position thereof after the scanning of a document is completed. The scanning capacity of the optical system is not uniform in every copying machine due to a drive motor itself of the optical system and fluctuation and/or imbalance of load on the drive motor and furthermore a lowering of the capacity by aging changes or temperature rise.

Therefore, when in such a copying machine shown in the above the scanning capacity of the optical system exceeds the transferability of the transfer mechanism of copying paper in the case of consecutive copying, the scanning for exposure must be waited for until the succeeding paper can be sent out from the resist section. So, the copying efficiency of the copying number of paper is decreased. On the other hand, when the scanning capacity of the optical system is lower than the transferability of copying paper as the paper feeding timing (timing on which paper is fed from the resist section) is determined by the scanning timing of the optical system, there may cause another problem that the copying number of paper which exceeds the fixed number of paper is fed in the transfer channel, and the succeeding paper is overlapped onto the copying paper which stops at the resist section.

SUMMARY OF THE INVENTION

Therefore, it is an object of the present invention to provide a document copying machine equipped with such a function as carrying out copying jobs efficiently at all times, utilizing the scanning capacity of the optical system to the maximum, for instance, without occurrence of a trouble of feeding copying paper more than the required copying number of paper into the transfer channel due to a lowering of the scanning capacity of the optical system.

In order to accomplish the above objects of the invention, according to the invention, a copying machine by which copying paper can be consecutively fed from the stock section regardless of the movemental timing of the resist section is so composed that the paper feeding speed or the paper feeding interval can be controlled according to the relative scanning time of the optical system for a document.

This specification of the present invention specifically points out the subject thereof and is complete with the claims clearly claimed. The above, and other objects, features and advantages of the present invention, will become apparent from the following description taken in conjunction with the accompanying drawings.

DETAILED DESCRIPTION OF THE PREFERRED EMBODIMENTS

The basic structure of the document copying machine according to the embodiment is roughly the same as that of the conventional document copying machine, and the point which is different from the conventional document copying machine exists in that the feeding speed of copying paper in a paper deck (stock section) to the resist section or the paper feeding interval can be controlled according to the relative scanning speed of the optical system for a document.

Namely, the time and interval needed per time of scanning by the optical system are to be measured, thereby causing the transfer speed of the transfer mechanism of copying paper to be controlled through feedback. This aims at promoting the efficiency of the paper feeding capacity in correspondence to imbalance of the time needed per cycle of scanning by the optical system, mainly the time needed for return of the optical system.

Also, in this case, the measurement of the time and the cycle needed per cycle of scanning by the optical system may be carried out whenever conducting copying jobs or may be effected at a proper timing. In addition, the feedback control on the basis of the measurement may be carried out whenever conducting copying jobs or may be effected at a proper timing, too.

Such processing programs as shown in the above are memorized in advance in a memory (ROM) of a control device (central processing unit) for controlling the document copying machine.

Figure 1:
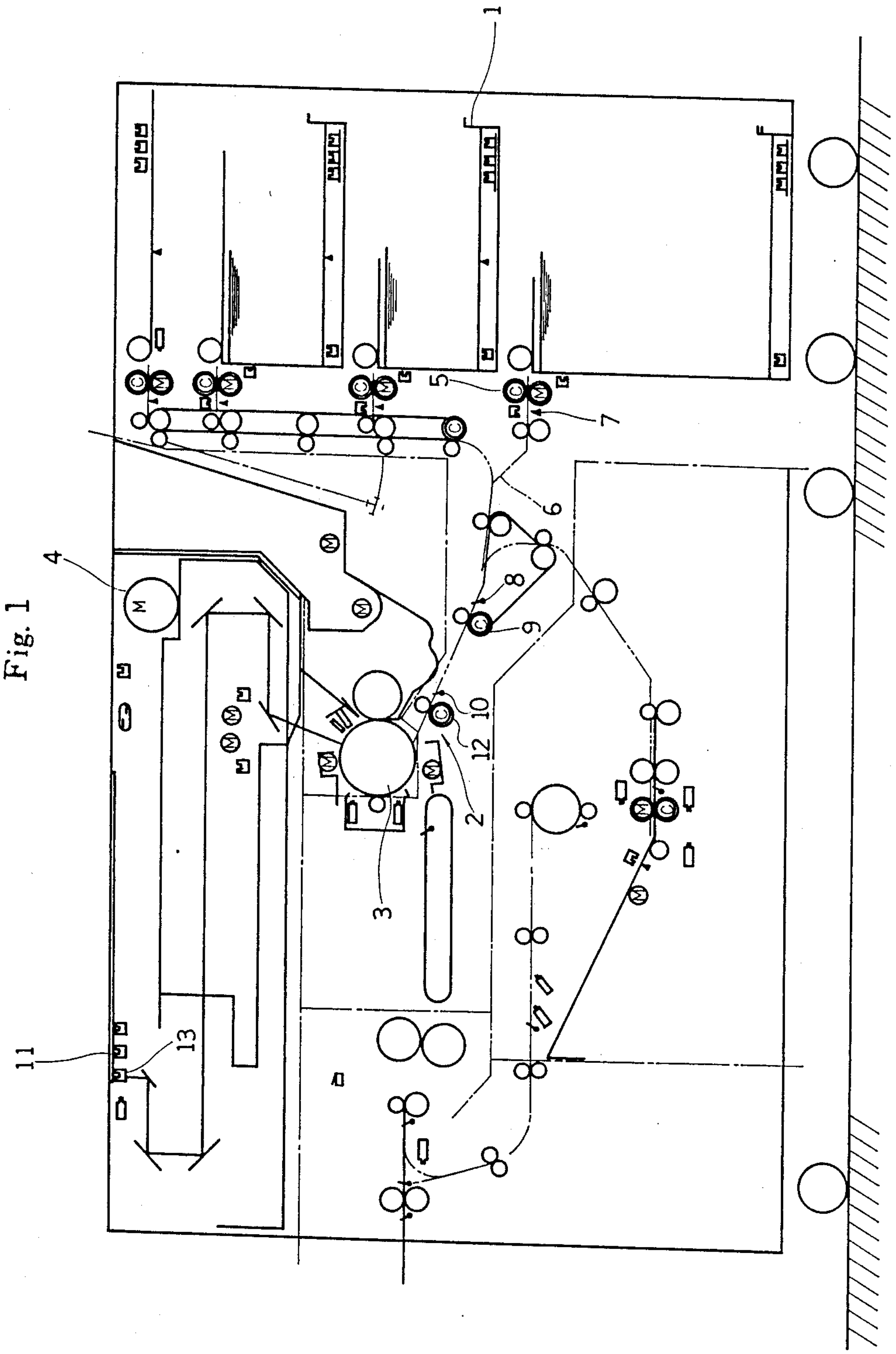
FIG. 1 is a view showing the conceptional composition of a document copying machine according to one of the preferred embodiments of the invention.
Figure 4:
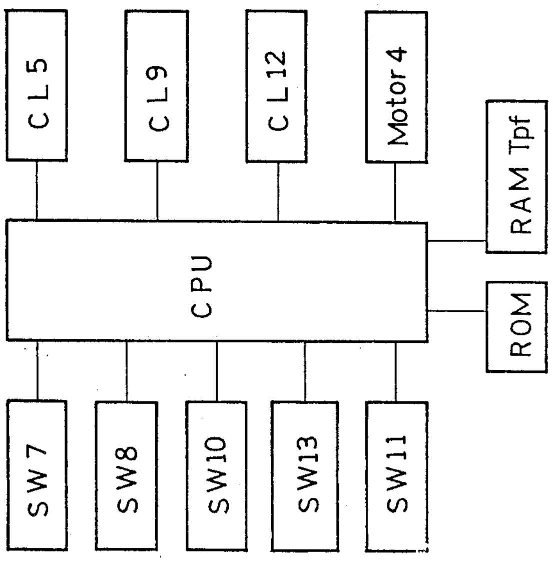
FIG. 4 is a block diagram showing a control device for realizing the processing on the basis of the timing chart shown in FIG. 2.

Subsequently, with reference to FIG. 1 and FIG. 2, the procedure by which copying paper in the paper deck 1 of the lower stage is fed one after another to the photosensitive drum 3 through the resist section 2 will be described. FIG. 4 shows the composition of hardwares to effect the above procedure.

Figure 2:
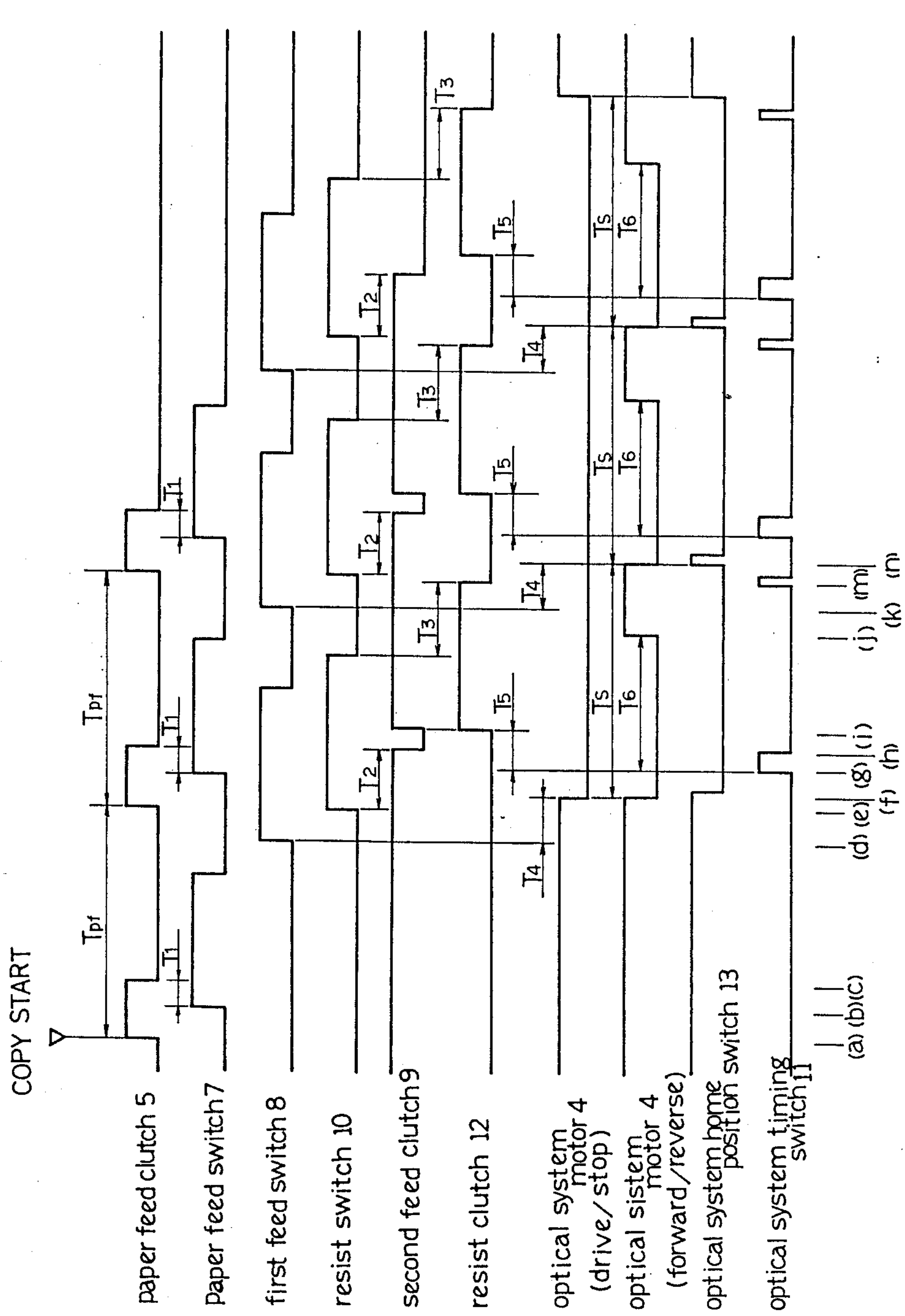
FIG. 2 is a timing chart showing the actional procedure of both paper transfer system and the optical system when consecutively copying by means of the document copying machine in FIG. 1.

In FIG. 2, "Tpf" is the time of paper feeding interval from the paper deck 1, and various values of the paper feeding interval "Tpf" are memorized in a memory in advance. "Ts" is the drive time of the optical system motor 4, which is required to make a cycle of scanning of the optical system, and is measured every time by a micro computer which constitutes the control device. "Tpfl"(in FIG. 3) is the minimum value of the time of the paper feeding interval, and corresponds to the speed when displaying full performance of the maximum transfer capacity by said transferring mechanism of the copying paper.

Firstly, in the case that the copying-start switch is turned on, the paper feeding clutch 5 is turned on to cause the paper feeding roller to rotate (a). Then, the feeding of copying paper in the paper deck 1 to the transfer channel 6 is started.

The paper feeding clutch 5 is turned off after "T1" time elapses (c) after the copying paper turns on the paper feeding switch 7 (b).

As the copying paper fed in the transfer channel 6 as shown in the above turns on the first feed switch 8 (d), it is detected that the copying paper has arrived at the position of the second feed roller driven by the second feed clutch 9. Then, the optical system motor 4 starts to rotate (f) in a required timing (i.e., in "T4" time) from the time of above detection, and at the same time, the optical system makes a forward movement.

On the other side, the copying paper passes through the second feed clutch 9 and is further fed to cause the resist switch 10 to be turned on (e). Then, the second feed clutch 9 is turned off (h) in a required timing (i.e., in "T2" time) therefrom, thereby causing the copying paper to come to a stop with the leading edge thereof inserted into the resist section 2.

As the optical system motor 4 rotates for instance clockwise, the optical system goes forwards and the timing switch 11 of the optical system is turned on (g). The resist clutch 12 to drive the resist section 2 is turned on (i) in a required timing (i.e., in "T5" time) (At this time, the second feed clutch 9 is turned on, too), thereby causing the copying processing to be effected as the feeding of the copying paper toward the photosensitive drum 3 is carried out.

The resist clutch 12 is turned off (m) after "T3" time further elapses after the resist switch 10 is turned off by the passing of the copying paper through the position of the resist switch 10.

The scanning time ("Ts") of the optical system from the start (f) of rotation of the optical system motor 4 until detecting (n) by the optical system home position switch 13 that the optical system has returned to the original position thereof with the direction of movement of the optical system reversed by the optical system motor 4 is measured by a micro computer. "T6" in the "Ts" time is needed for exposure and scanning (k), and the time from starting (k) of the optical system reversing to the arrival (n) of the optical system at the home position thereof is the time necessary for the optical system to return.

And the time "Tpf" memorized in the memory in advance is properly set in response to the time "Ts" (scanning time), and the time of paper feeding interval or the paper feeding speed is so controlled that the paper feeding timing from the paper deck 1 can be made coincident with the timing on the next scanning of the optical system, and copying paper can be consecutively fed toward the resist section 2.

As a result, the copying paper fed at the timing (e) after the time "Tpf" turns on the first feed switch 8 (1). After that, the point (n) when the time of "T4" has elapsed is agreed with the scanning-start timing of the optical system of the next time corresponding to the copying paper.

As mentioned abodes, as the paper feeding speed or the time of paper feeding interval of the copying paper is controlled for feeding the copying paper by turns in response to the relative scanning speed for the documents of the optical system, such a document copying machine that the scanning capacity of the optical system thereof can be utilized to the maximum can be thus effected.

Figure 3:
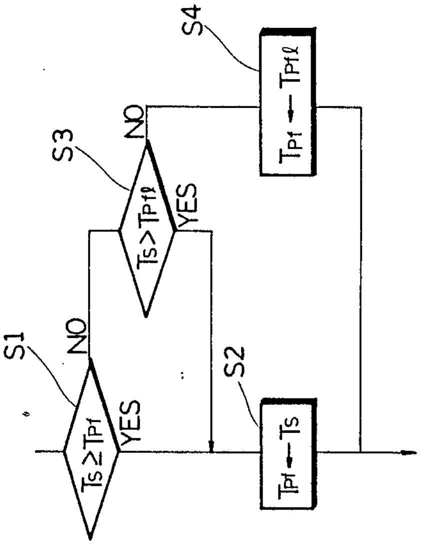
FIG. 3 is a flow chart showing the procedure when compensating the copying number of paper according to the scanning speed of the optical system in the copying machine in FIG. 1.

Subsequently, the correcting procedure of the time ("Tpf") of paper feeding interval of the copying paper is further described in details with regard to FIG. 3. Besides, even though the paper feeding speed is corrected, similar functions can be accomplished. Also in FIG. 3, the steps S1, S2, . . . show respective movemental steps.

In the case of having judged that in the step S1 "T3" is equal to or larger than "Tpf", that is, in the case of having judged that the scanning speed of the optical system is slower than the paper feeding speed, the value of "Tpf" is to be displaced with that of "Ts" so as to correspond to the scanning speed of the optical system (The step S2). In this case, the scanning speed of the optical system may be agreed with the paper feeding speed of the copying paper at a required ratio, and it is possible to set the speeds so that they can be controlled in the range having a prompt width.

In the step S1, in the case of having judged that the value of "Ts" is smaller than the "Tpf", that is, when the scanning speed of the optical system is faster than the paper feeding speed of the copying paper, the "Ts" is compared with "Tpfl" in the step S3. And in the case of having judged that the value of the "Ts" is larger than the "Tpfl", that is, when the scanning speed of the optical system is slower than the maximum paper feeding speed of the copying paper, the paper feeding speed is changed and set to such a faster speed that the paper feeding speed can approach to the scanning speed of the optical system or the time "Tpf" is corrected to a shorter value (in the step 2).

On the other hand, in the step S3, in the case of having judged that the "Ts" is smaller than the "Tpfl", that is, when the scanning speed of the optical system is faster than the maximum paper feeding speed, the processing in the step S2 is omitted as the paper feeding speed can be no more matched to the scanning speed of the optical system.

Namely, the paper feeding speed of the copying paper can be increased to the limit of the scanning capacity of the optical system in each of the above steps.

Therefore, in a document copying machine according to the embodiment of the invention, the scanning capacity of the optical system can be utilized to the maximum and it is possible to carry out copying jobs efficiently at all times, without occurrence of such a trouble that for instance copying paper is fed in the transfer channel by more than the required copying number of paper due to a lowering of the scanning capacity of the optical system.

It will be apparent that many other modifications and variations could be effected by one skilled in the art without departing from the spirit and scope of the novel concept of the invention. Therefore, though the above embodiments are a preferred example, the invention is not limited to the above embodiments.

It can be understood that any modifications and variations which can be produced within the inventive scopes shown in the claims described hereinafter and the scope meant by the claims hereof are all included in the claims attached hereto.

What is claimed is:

1. A copying machine so composed that copying paper can be consecutively fed from the stock section thereof regardless of the movemental timing of the resist section thereof characterized by that the paper feeding speed or the paper feeding interval of the copying paper can be controlled in response to the relative scanning time of the optical system for a document.

2. A copying machine claimed in the claim 1, wherein the scanning time can be measured whenever conducting copying jobs.

3. A copying machine claimed in the claim 2, wherein the paper feeding speed or the paper feeding interval can be controlled whenever conducting copying jobs.

4. A copying machine claimed in the claim 1, wherein in the case that the scanning time is equal to or longer than the time of paper feeding interval, the time of paper feeding interval can be agreed with the above scanning time.

5. A copying machine claimed in the claim 4, wherein in the case that the scanning time is shorter than the time of paper feeding interval and is longer than the minimum time of paper feeding interval, the time of the paper feeding interval can be agreed with the scanning time.

6. A copying machine claimed in the claim 5, wherein in the case that the scanning time is equal to or shorter than the minimum time of the paper feeding interval, the time of paper feeding interval is agreed with the minimum time of paper feeding interval.

* * * * *